(12) United States Patent
Huang et al.

(10) Patent No.: US 11,837,713 B2
(45) Date of Patent: Dec. 5, 2023

(54) PREPARATION METHOD OF CATHODE MATERIAL FOR SECONDARY BATTERY

(71) Applicant: Advanced Lithium Electrochemistry Co., Ltd., Taoyuan (TW)

(72) Inventors: Chen-Yi Huang, Taoyuan (TW); Han-Wei Hsieh, Taoyuan (TW); Yuan-Kai Lin, Taoyuan (TW); Chueh-Han Wang, Taoyuan (TW)

(73) Assignee: ADVANCED LITHIUM ELECTROCHEMISTRY CO., LTD., Taoyuan (TW)

(*) Notice: Subject to any disclaimer, the term of this patent is extended or adjusted under 35 U.S.C. 154(b) by 0 days.

(21) Appl. No.: 17/412,259

(22) Filed: Aug. 26, 2021

(65) Prior Publication Data

US 2023/0063332 A1     Mar. 2, 2023

(30) Foreign Application Priority Data

Aug. 17, 2021   (TW) .................................. 110130344

(51) Int. Cl.
*H01M 4/04*      (2006.01)
*H01M 4/1397*   (2010.01)
(Continued)

(52) U.S. Cl.
CPC ....... *H01M 4/1397* (2013.01); *H01M 4/0404* (2013.01); *H01M 4/0471* (2013.01);
(Continued)

(58) Field of Classification Search
CPC .............................................. H01M 2004/021
See application file for complete search history.

(56) References Cited

U.S. PATENT DOCUMENTS

2008/0096098 A1* 4/2008 Shirakata ............ H01M 4/5825
                                                         429/231.95
2010/0112449 A1   5/2010 Fujita et al.
(Continued)

FOREIGN PATENT DOCUMENTS

CA        2907374 C      9/2014
CN      109326779 A      2/2019
(Continued)

*Primary Examiner* — Austin Murata
(74) *Attorney, Agent, or Firm* — KIRTON McCONKIE; Evan R. Witt

(57) ABSTRACT

A preparation method of a cathode material for a secondary battery is provided. First, a lithium metal phosphate material and a first conductive carbon are provided. The lithium metal phosphate material is made of a plurality of secondary particles. Each of the secondary particles is formed by the aggregation of a plurality of primary particles. An interparticle space is formed between the plurality of primary particles. Next, the lithium metal phosphate material and the first conductive carbon are mixed by a mechanical method, and a composite material is prepared. The first conductive carbon is uniformly arranged in the interparticle space. After that, a second conductive carbon, a binder and a solvent are provided. Finally, the composite material, the second conductive carbon, the binder and the solvent are mixed, and a cathode material for preparing a positive plate is prepared.

10 Claims, 14 Drawing Sheets

(51) Int. Cl.
  *H01M 4/58* (2010.01)
  *H01M 4/62* (2006.01)
  *H01M 10/0525* (2010.01)
  *H01M 4/02* (2006.01)

(52) U.S. Cl.
  CPC ......... *H01M 4/5825* (2013.01); *H01M 4/625* (2013.01); *H01M 10/0525* (2013.01); *H01M 2004/021* (2013.01); *H01M 2004/028* (2013.01)

(56) References Cited

U.S. PATENT DOCUMENTS

| | | |
|---|---|---|
| 2011/0070499 A1 | 3/2011 | Huang et al. |
| 2011/0136014 A1 | 6/2011 | Kay |
| 2012/0196185 A1* | 8/2012 | Kono ...................... H01M 4/62 |
| | | 429/231.95 |
| 2014/0023926 A1* | 1/2014 | Li ......................... H01M 4/139 |
| | | 429/223 |
| 2014/0295275 A1 | 10/2014 | Kay |
| 2018/0277846 A1 | 9/2018 | Oono et al. |
| 2019/0252131 A1* | 8/2019 | Zhamu .................. H01G 11/50 |
| 2021/0036326 A1* | 2/2021 | Han ........................ C08K 3/04 |
| 2021/0313559 A1* | 10/2021 | Zettsu .................. H01M 4/625 |

FOREIGN PATENT DOCUMENTS

| | | |
|---|---|---|
| CN | 111261925 A | 6/2020 |
| CN | 112838192 A | 5/2021 |
| CN | 113113583 A | 7/2021 |
| JP | 2015153535 A | 8/2015 |
| JP | 6841362 B1 | 3/2021 |
| TW | 201737537 A | 10/2017 |

* cited by examiner

PREPARATION METHOD OF CATHODE MATERIAL FOR SECONDARY BATTERY

FIELD OF THE INVENTION

The present disclosure relates to a preparation method of a cathode material for a secondary battery, and more particularly to a preparation method of a cathode material for a secondary battery that stably improves charging and discharging performance thereof.

BACKGROUND OF THE INVENTION

Nowadays, with the rapid development of science and technology, reusable secondary batteries are widely used in the fields of electric vehicles, energy storage, and so on. In order to pursue higher efficiency and convenience, the secondary battery is required to have good energy density and charging and discharging performance. It is noted that the performance of the secondary battery is closely related to the choice of cathode material.

A cathode material for the secondary battery, such as lithium metal phosphate ($LiMPO_4$), is mixed with a conductive carbon, a binder and a solvent to prepare an electrode. However, the conventional preparation method requires adjustment of various parameters to ensure the uniformity of the ingredients. Since the parameters need to be adjusted accurately, the uniformity of the ingredients is difficult to be achieved. The nonuniformity of the ingredients adversely affects the performance of the battery.

Therefore, there is a need to provide a preparation method of a cathode material for a secondary battery that stably improves charging and discharging performance thereof.

SUMMARY OF THE INVENTION

An object of the present disclosure is to provide a preparation method of a cathode material for a secondary battery that stably improves charging and discharging performance thereof. A lithium metal phosphate material is made of a plurality of secondary particles. Each of the secondary particles is formed by the aggregation of a plurality of primary particles. First, the lithium metal phosphate material and a first conductive carbon are mixed by a mechanical method, such as a mechanofusion method, and a composite material is prepared. A mechanofusion method uses strong compression and shear forces to induce mechano-chemical reactions between multiple particles and form new particles. The first conductive carbon is uniformly arranged in an interparticle space formed between the plurality of primary particles. Next, the composite material, a second conductive carbon, a binder and a solvent are mixed by, for example, a vacuum mixer, and the cathode material is prepared. Finally, the cathode material is coated on a substrate, such as an aluminum coil, and a positive plate is prepared. By mixing the lithium metal phosphate material and a part of the conductive carbon by the mechanical method previously, the conductive carbon is uniformly arranged between the primary particles of the lithium metal phosphate material. The interface impedance caused by the interparticle space is reduced, and the uniformity of the ingredients is improved. Since part of the conductive carbon already exists in the composite material, when the composite material, the binder, and the solvent are mixed, only a small amount of conductive carbon needs to be added to prepare the cathode material. By adding less conductive carbon when mixing, the viscosity of the slurry is reduced and the solid content is increased. The loading density of the cathode material coated on the substrate and the adhesion strength therebetween are both increased. The preparation method of the cathode material is simple and easy to control. The positive plate made of the cathode material maintains high capacity at high charging and discharging rate (C-rate), and the excellent fast charging performance is achieved.

In accordance with an aspect of the present disclosure, a preparation method of a cathode material for a secondary battery is provided. The preparation method includes steps of: (a) providing a lithium metal phosphate material and a first conductive carbon, wherein the lithium metal phosphate material is made of a plurality of secondary particles, each of the secondary particles is formed by the aggregation of a plurality of primary particles, and an interparticle space is formed between the plurality of primary particles; (b) mixing the lithium metal phosphate material and the first conductive carbon by a mechanical method to prepare a composite material, wherein the first conductive carbon is uniformly arranged in the interparticle space; (c) providing a second conductive carbon, a binder and a solvent; and (d) mixing the composite material, the second conductive carbon, the binder and the solvent to prepare the cathode material for preparing a positive plate.

In an embodiment, the composition of the lithium metal phosphate material comprises $LiMPO_4$. M is one selected from the group consisting of iron, nickel, cobalt, manganese, magnesium, titanium, aluminum, tin, chromium, vanadium, molybdenum and a combination thereof.

In an embodiment, the plurality of primary particles has an average particle size ranged from 50 nm to 500 nm.

In an embodiment, the plurality of secondary particles has an average particle size ranged from 2 μm to 100 μm.

In an embodiment, the first conductive carbon has an average particle size ranged from 10 nm to 200 nm.

In an embodiment, the mechanical method is a mechanofusion method.

In an embodiment, the mechanical method has a working temperature ranged from 25° C. to 35° C.

In an embodiment, the mechanical method has a rotational speed ranged from 100 rpm to 2000 rpm.

In an embodiment, the first conductive carbon in the composite material has a weight percentage ranged from 0.5% to 10%.

In an embodiment, the step (d) further includes a step of: (d1) coating the cathode material on a substrate and drying to prepare the positive plate.

DETAILED DESCRIPTION OF THE PREFERRED EMBODIMENT

The present disclosure will now be described more specifically with reference to the following embodiments. It is to be noted that the following descriptions of preferred embodiments of the disclosure are presented herein for purpose of illustration and description only. It is not intended to be exhaustive or to be limited to the precise form disclosed.

Figure 1:
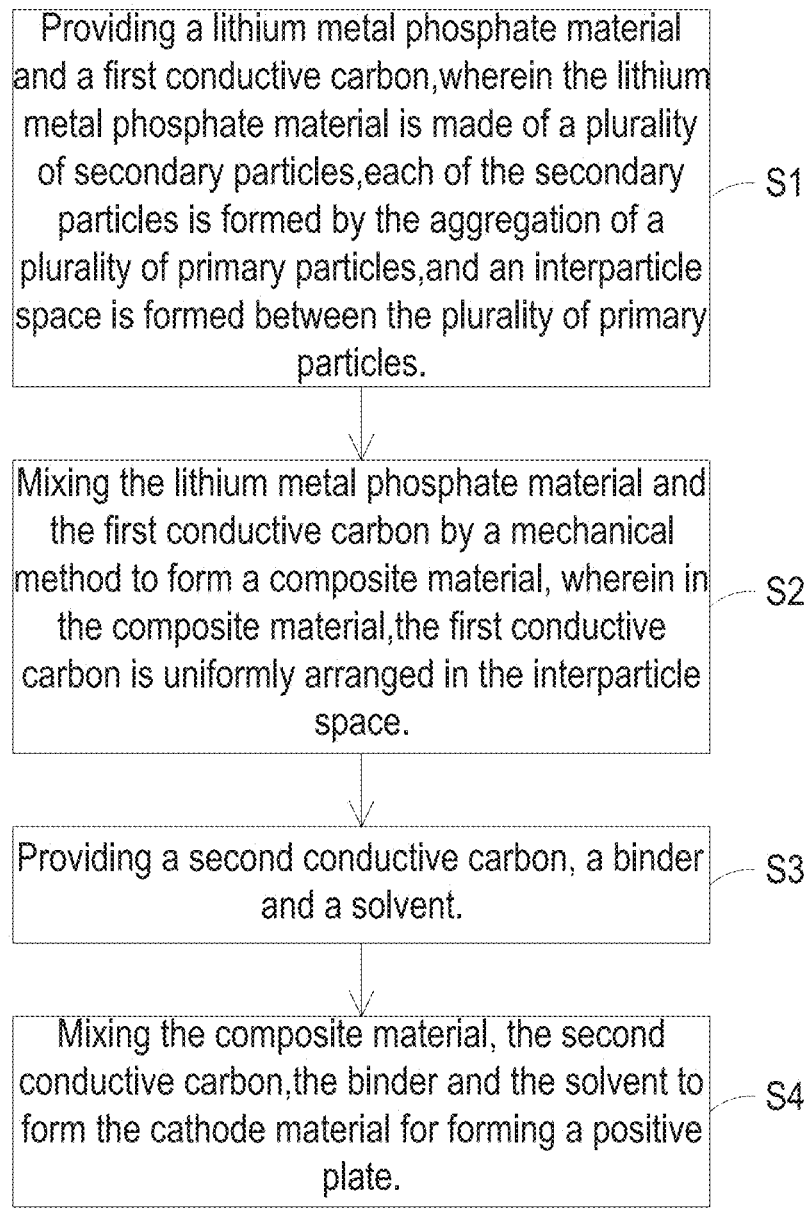
FIG. 1 is a flow chart of a preparation method of a cathode material for a secondary battery according to an embodiment of the present disclosure.
Figure 2:
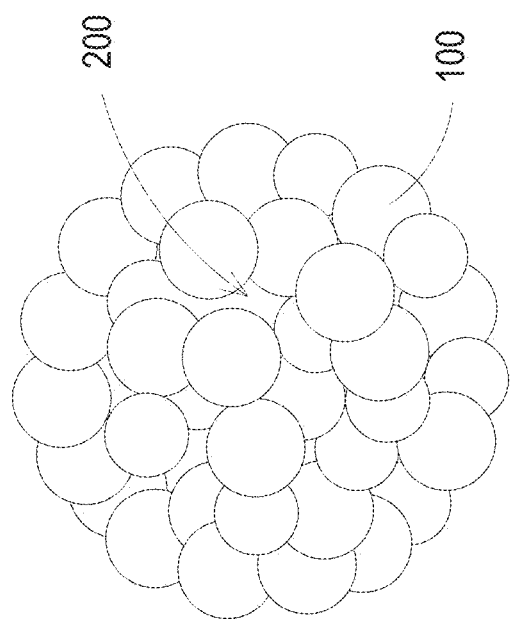
FIG. 2 is a schematic view illustrating the secondary particle according to an embodiment of the present disclosure.
Figure 3:
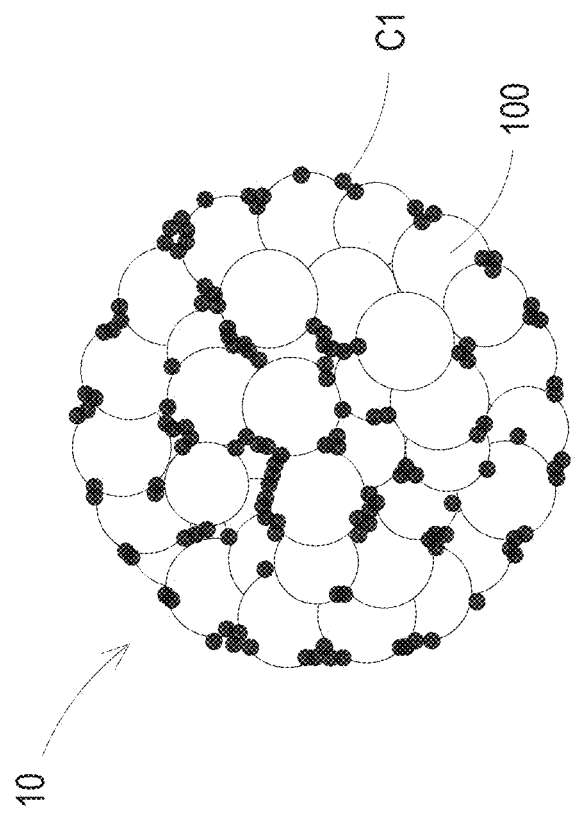
FIG. 3 is a schematic view illustrating a composite material according to the embodiment of the present disclosure.
Figure 4:
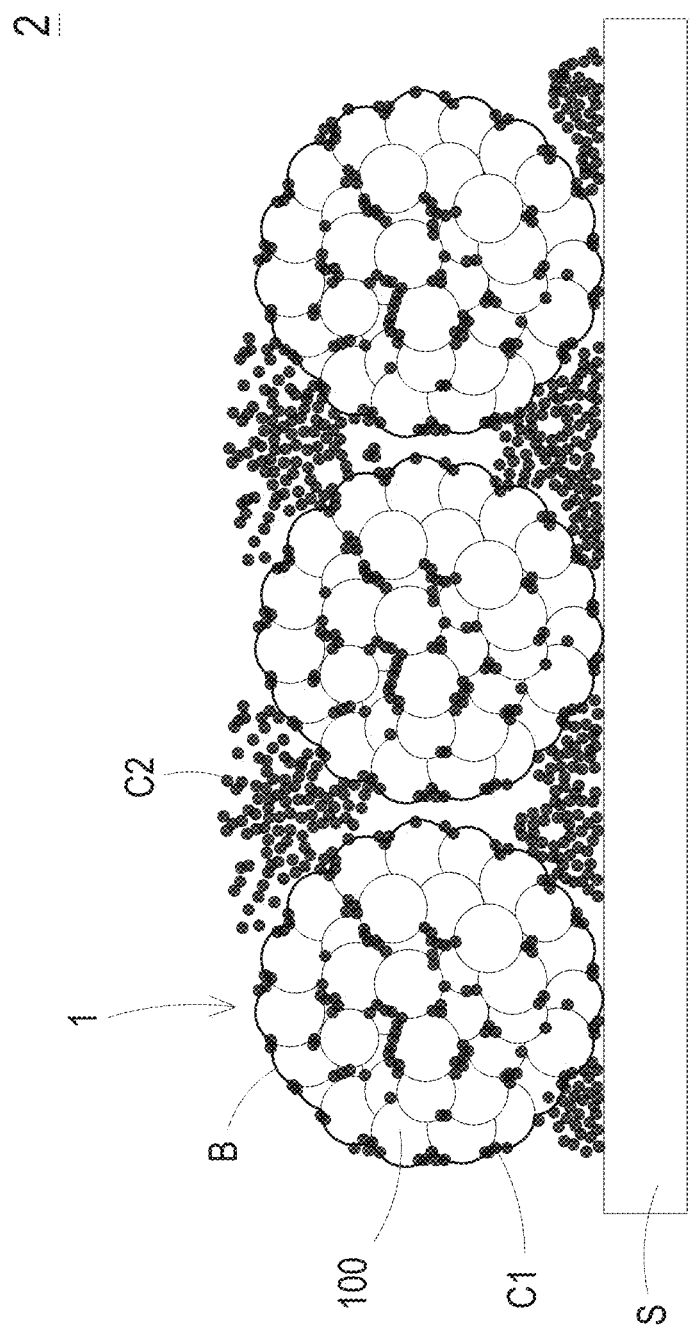
FIG. 4 is a schematic view illustrating a positive plate made of the cathode material according to the embodiment of the present disclosure.

Refer to FIGS. 1 to 4. FIG. 1 is a flow chart of a preparation method of a cathode material for a secondary battery according to an embodiment of the present disclosure. FIG. 2 is a schematic view illustrating the secondary particle according to an embodiment of the present disclosure. FIG. 3 is a schematic view illustrating a composite material according to an embodiment of the present disclosure. FIG. 4 is a schematic view illustrating a positive plate made of the cathode material according to an embodiment of the present disclosure. Firstly, a lithium metal phosphate material and a first conductive carbon C1 are provided, as shown in step S1. The lithium metal phosphate material is made of a plurality of secondary particles 10. Each of the secondary particles 10 is formed by the aggregation of a plurality of primary particles 100, as shown in the FIG. 2. An interparticle space 200 is formed between the plurality of primary particles 10. The composition of the lithium metal phosphate material includes $LiMPO_4$. M is one selected from the group consisting of iron, nickel, cobalt, manganese, magnesium, titanium, aluminum, tin, chromium, vanadium, molybdenum and a combination thereof. In the embodiment, the lithium metal phosphate material is a lithium iron phosphate with carbon coating (LFP/C). The first conductive carbon C1 is Super P. Super P has high purity and conductivity, and is dispersed around the particles to form a branched conductive network. Accordingly, the electrolyte ideally contacts the oxide particles, and the conductivity of the positive plate 2 is increased. In other embodiments, the first conductive carbon C1 is a carbon material such as a carbon nanotubes or a graphene, and the present disclosure is not limited thereto. In the embodiment, the plurality of primary particles 100 has an average particle size ranged from 50 nm to 500 nm. The plurality of secondary particles 10 has an average particle size ranged from 2 μm to 100 μm. The first conductive carbon C1 has an average particle size ranged from 10 nm to 200 nm.

Secondly, the lithium metal phosphate material, such as LFP/C, and the first conductive carbon C1, such as Super P, are mixed by a mechanical method, and a composite material 1 is prepared, as shown in step S2. The first conductive carbon C1, such as Super P, is uniformly arranged in the interparticle space 200, as shown in FIG. 3. With uniform arrangement of the first conductive carbon C1 between the primary particles 100, the interface impedance inside the secondary particle 10, such as lithium iron phosphate (LFP), is reduced. In the embodiment, the mechanical method is a mechanofusion method, which induces mechano-chemical reactions between the lithium metal phosphate material and the first conductive carbon C1 and form the composite material 1 by using strong compression and shear forces. The mechanofusion method has a working temperature ranged from 25° C. to 35° C. and a rotational speed ranged from 100 rpm to 2000 rpm. The first conductive carbon C1 in the composite material 1 has a weight percentage ranged from 0.5% to 10%.

After that, a second conductive carbon C2, a binder B and a solvent are provided, as shown in step S3. Preferably but not exclusively, in the embodiment, the second conductive carbon C2 is Super P, the binder B is polyvinylidene fluoride (PVDF), and the solvent is N-Methylpyrrolidone (NMP).

Finally, the composite material 1, the second conductive carbon C2, the binder B and the solvent are mixed, and the cathode material is prepared. In the embodiment, the cathode material is prepared by a vacuum mixer. The weight ratio of the lithium metal phosphate material, the total conductive carbon (the total of the first conductive carbon C1 and the second conductive carbon C2) and the binder B added to the vacuum mixer and mixed therein is 8:1:1. In other embodiments, the weight ratio is adjustable according to actual needs, and the present disclosure is not limited thereto. In the embodiment, the cathode material prepared by mixing the composite material 1, the second conductive carbon C2, the binder B and the solvent is coated on a substrate S, such as an aluminum coil, and dried to prepare a positive plate 2. The structure of the positive plate 2 is shown in FIG. 4. The composite material 1 is located on the substrate S. The binder B is located on the outer layer of each of the secondary particles 10. The second conductive carbon C2 is located between the secondary particles 10.

The following examples illustrate the preparation method and efficacy of the present disclosure.

Example 1

Firstly, a lithium metal phosphate material and a first conductive carbon are provided. The lithium metal phosphate material is made of a plurality of secondary particles. Each of the secondary particles is formed by the aggregation of a plurality of primary particles. The lithium metal phosphate material is a lithium iron phosphate with carbon coating (LFP/C). The first conductive carbon is Super P. Lithium iron phosphate secondary particles are spherical, and are formed by the aggregation of a plurality of primary particles, respectively. An interparticle space is formed between the plurality of primary particles.

Secondly, the lithium metal phosphate material and the first conductive carbon are mixed by a mechanical method, and a composite material is prepared. The first conductive carbon is uniformly arranged in the interparticle space. At a working temperature ranged from 25° C. to 35° C., the lithium metal phosphate material and the first conductive carbon are mixed by a mechanofusion method at 600 rpm for 10 minutes, and then mixed at 1200 rpm for 30 minutes to form the composite material. In the composite material, the weight percentage of the first conductive carbon is about 0.47%.

After that, a second conductive carbon, a binder and a solvent are provided. Preferably but not exclusively, the second conductive carbon is Super P, the binder is PVDF, and the solvent is NMP.

Finally, the composite material, the second conductive carbon, the binder and the solvent are mixed, and the cathode material is prepared. The cathode material is coated on a substrate and dried, and a positive plate is prepared. The weight ratio of the lithium metal phosphate material, the total conductive carbon (the total of the first conductive carbon and the second conductive carbon) and the binder added to the vacuum mixer and mixed therein is 8:1:1. In other words, the weight of the added second conductive carbon needs to be adjusted accordingly in consideration of the weight percentage of the first conductive carbon in the composite material. Since the weight percentage of the first conductive carbon of the example 1 in the composite material is about 0.47%, the weight ratio of the lithium metal phosphate material, the second conductive carbon and the binder added to the vacuum mixer is 8.04:0.96:1. First, the solvent is added to the vacuum mixer and mixed at 1200 rpm for 30 minutes. Next, the second conductive carbon and the binder are added and mixed at 1200 rpm for 30 minutes. Finally, the composite material is added and mixed at 1200 rpm for 60 minutes, and then mixed at 130 rpm for 30 minutes to prepare the cathode material. The prepared cathode material is coated on a substrate, which is an aluminum coil, and dried, and a positive plate is prepared.

Example 2

Preferably but not exclusively, a preparation method of the example 2 is similar to that of the example 1. However, in the composite material of the example 2, the weight percentage of the first conductive carbon is about 1.21%. Accordingly, in the example 2, the weight ratio of the composite material, the second conductive carbon and the binder added to the vacuum mixer is 8.1:0.9:1.

Example 3

Preferably but not exclusively, a preparation method of the example 3 is similar to that of the example 1. However, in the composite material of the example 3, the weight percentage of the first conductive carbon is about 3.65%. Accordingly, in the example 3, the weight ratio of the composite material, the second conductive carbon and the binder added to the vacuum mixer is 8.3:0.7:1.

Example 4

Preferably but not exclusively, a preparation method of the example 4 is similar to that of the example 1. However, in the composite material of the example 4, the weight percentage of the first conductive carbon is about 8.09%. Accordingly, in the example 4, the ratio of the composite material, the second conductive carbon and the binder added to the vacuum mixer is 8.17:0.3:1.

COMPARATIVE EXAMPLE

The lithium metal phosphate material of the comparative example is not mixed with the first conductive carbon previously to form a composite material. Preferably but not exclusively, in the comparative example, the lithium metal phosphate material, the conductive carbon and the binder are added to the vacuum mixer directly to prepare a positive plate by a preparation method similar to that of the example 1. The weight ratio of the composite material, the conductive carbon and the binder added to the vacuum mixer is 8:1:1.

Figure 5A:
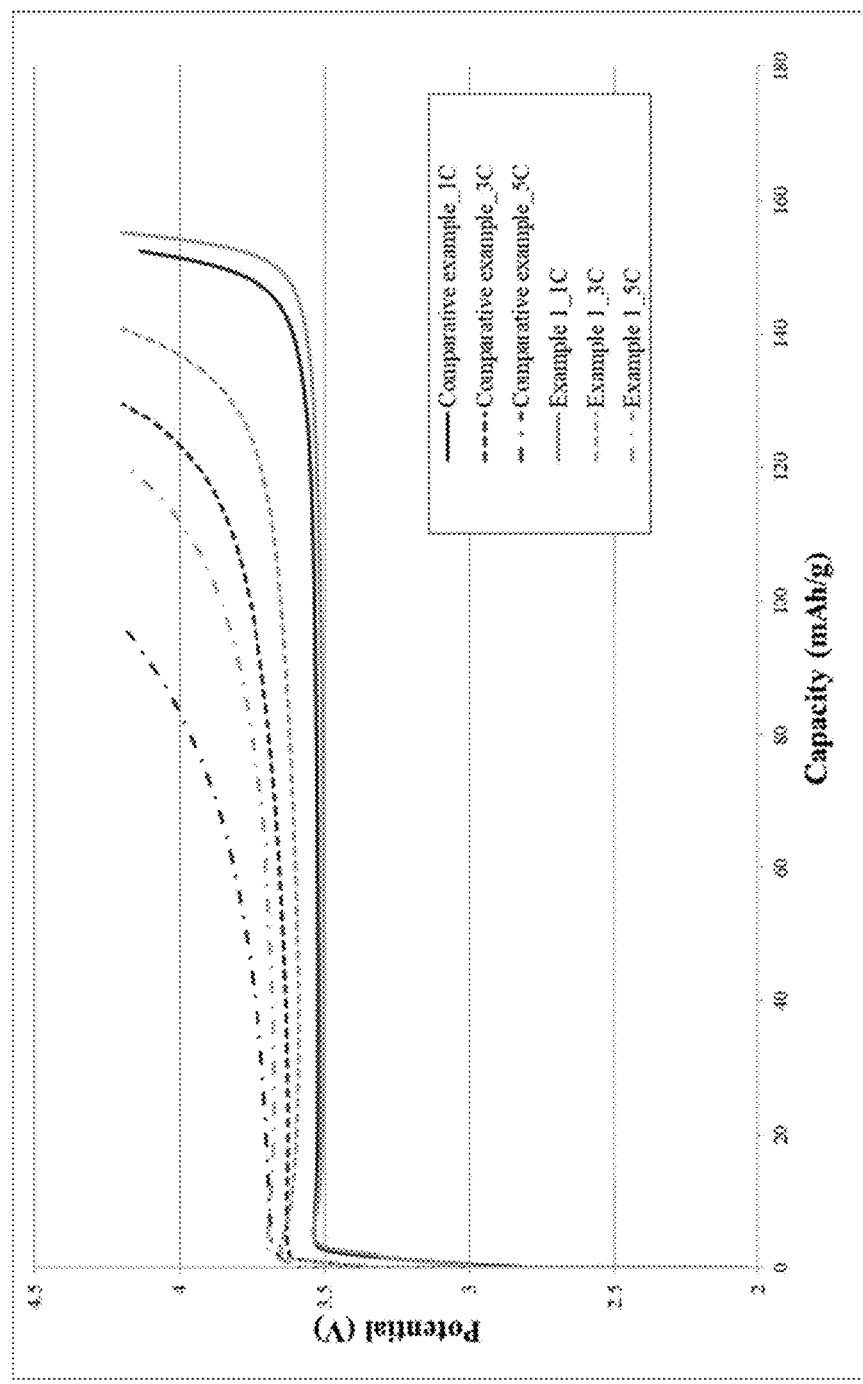
FIG. 5A is a charging characteristic diagram (potential vs. capacity) of a comparative example and an example 1 at different C-rates.
Figure 5B:
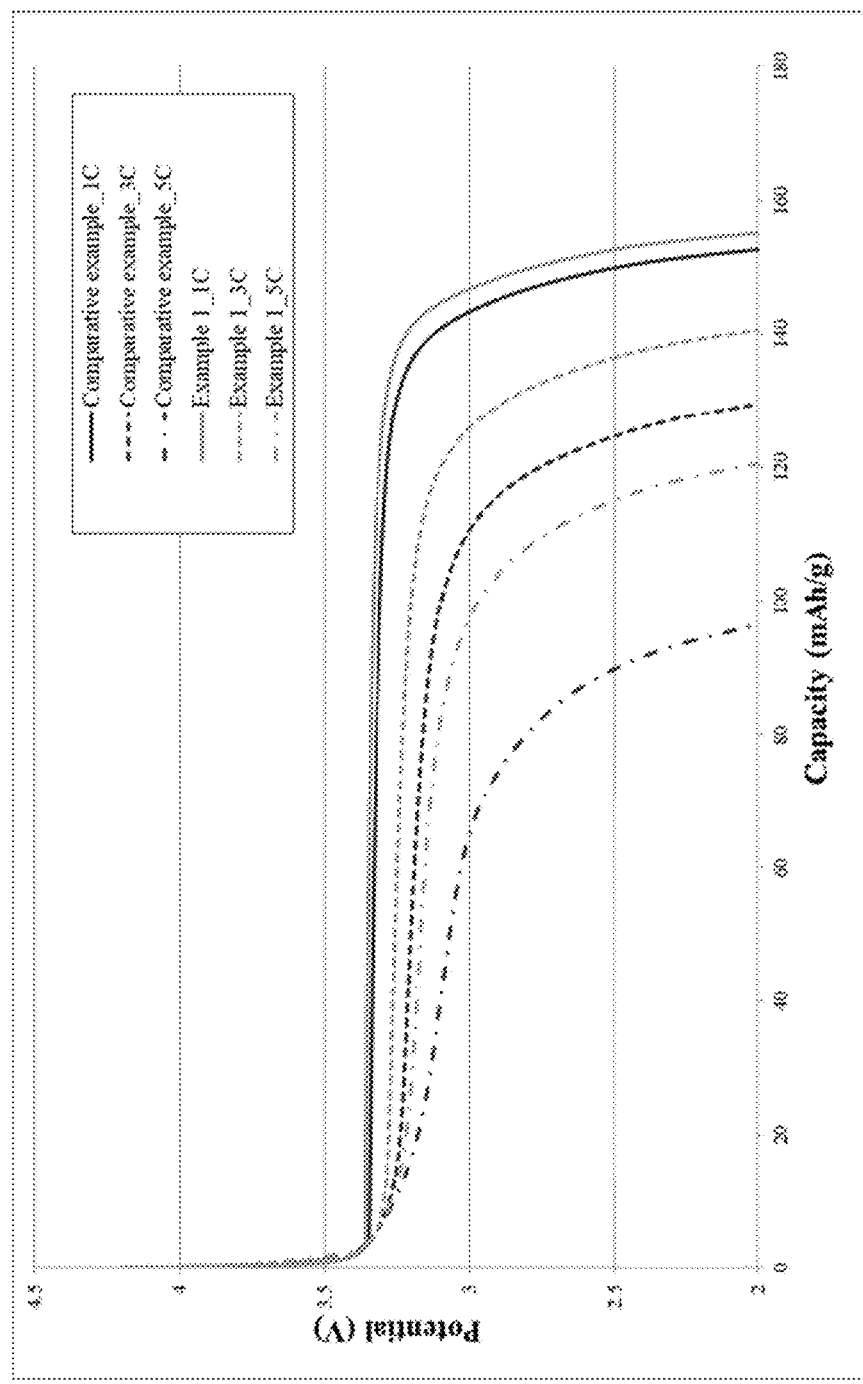
FIG. 5B is a discharging characteristic diagram (potential vs. capacity) of the comparative example and the example 1 at different C-rates.
Figure 6A:
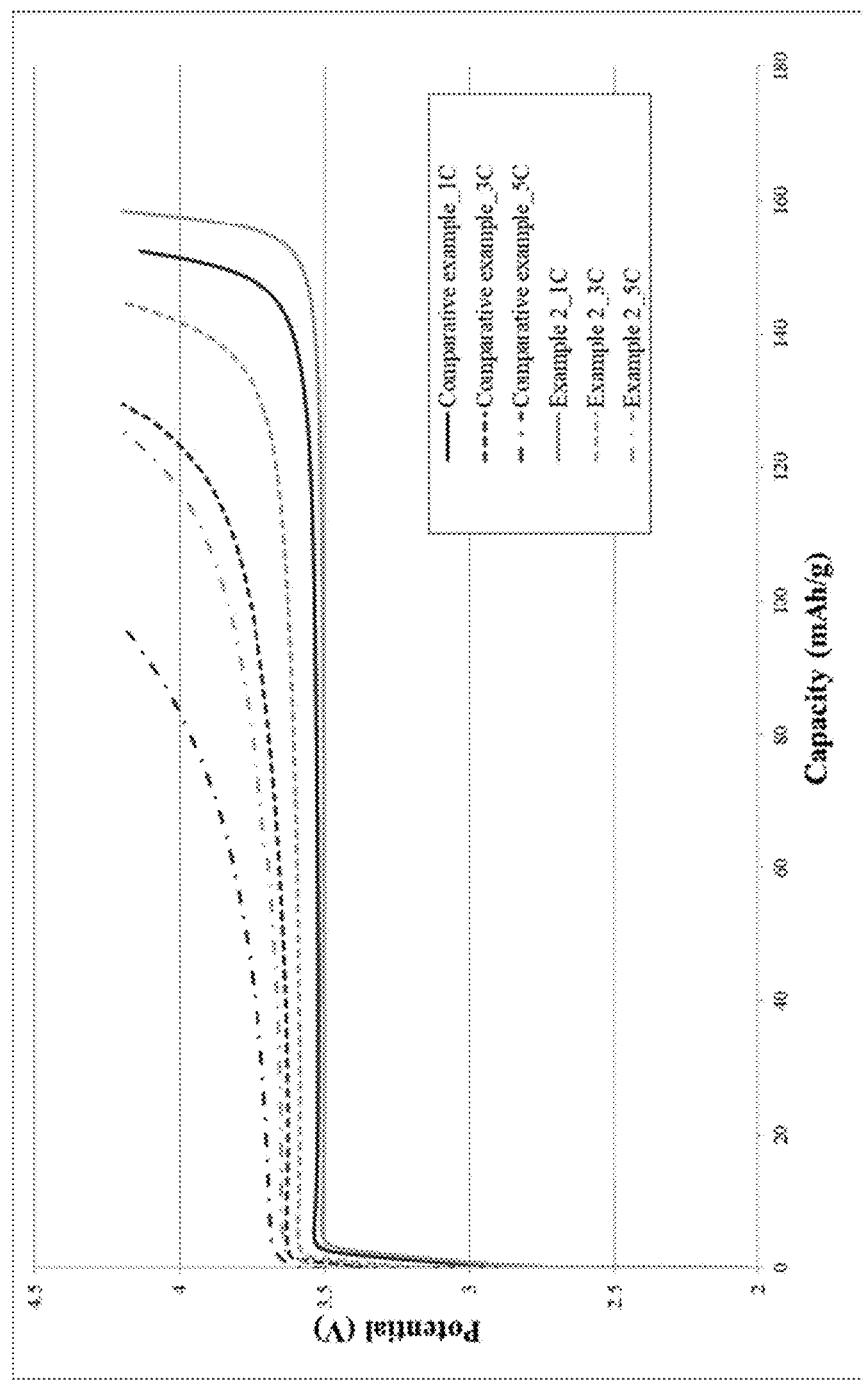
FIG. 6A is a charging characteristic diagram (potential vs. capacity) of the comparative example and an example 2 at different C-rates.
Figure 6B:
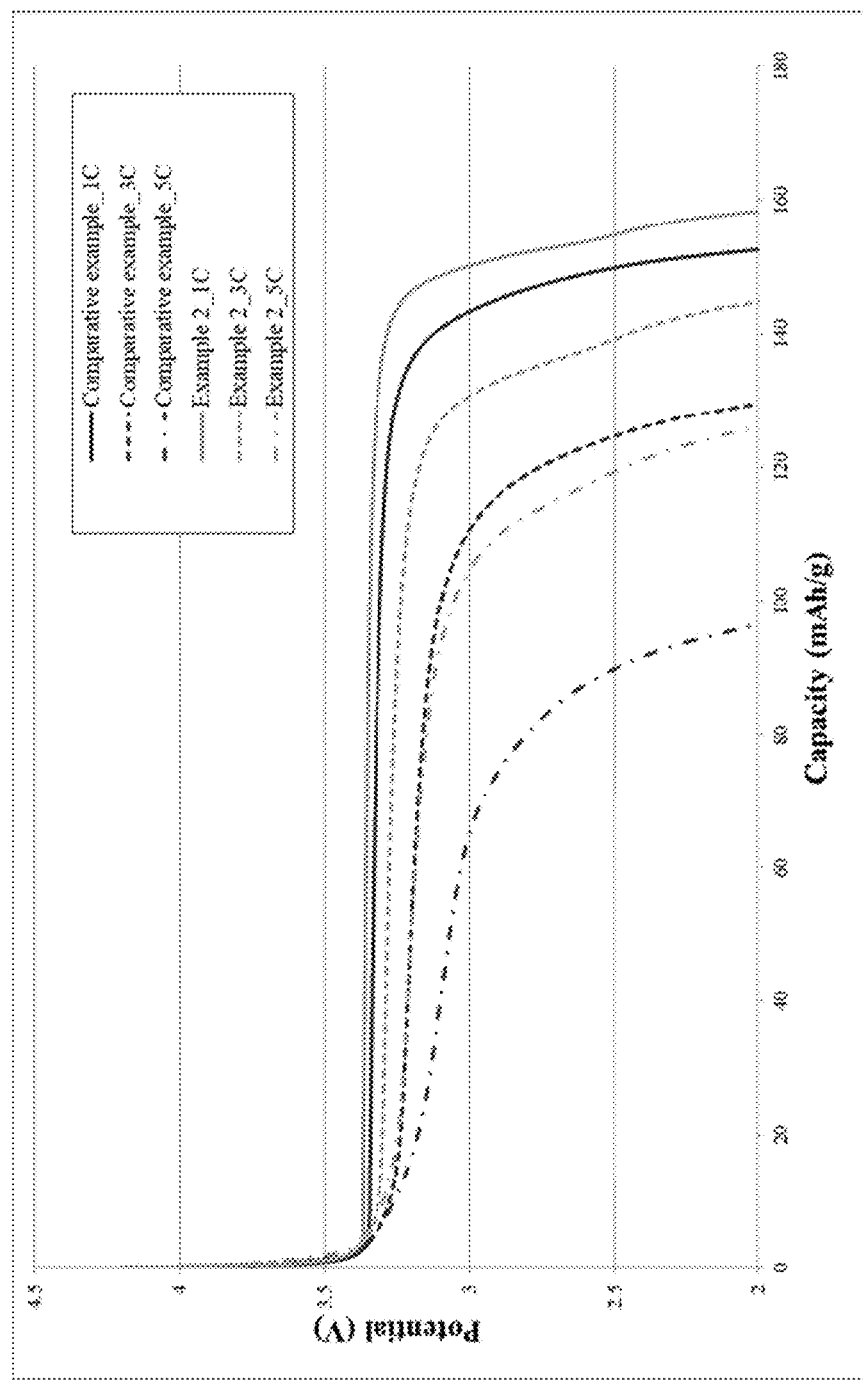
FIG. 6B is a discharging characteristic diagram (potential vs. capacity) of the comparative example and the example 2 at different C-rates.
Figure 7A:
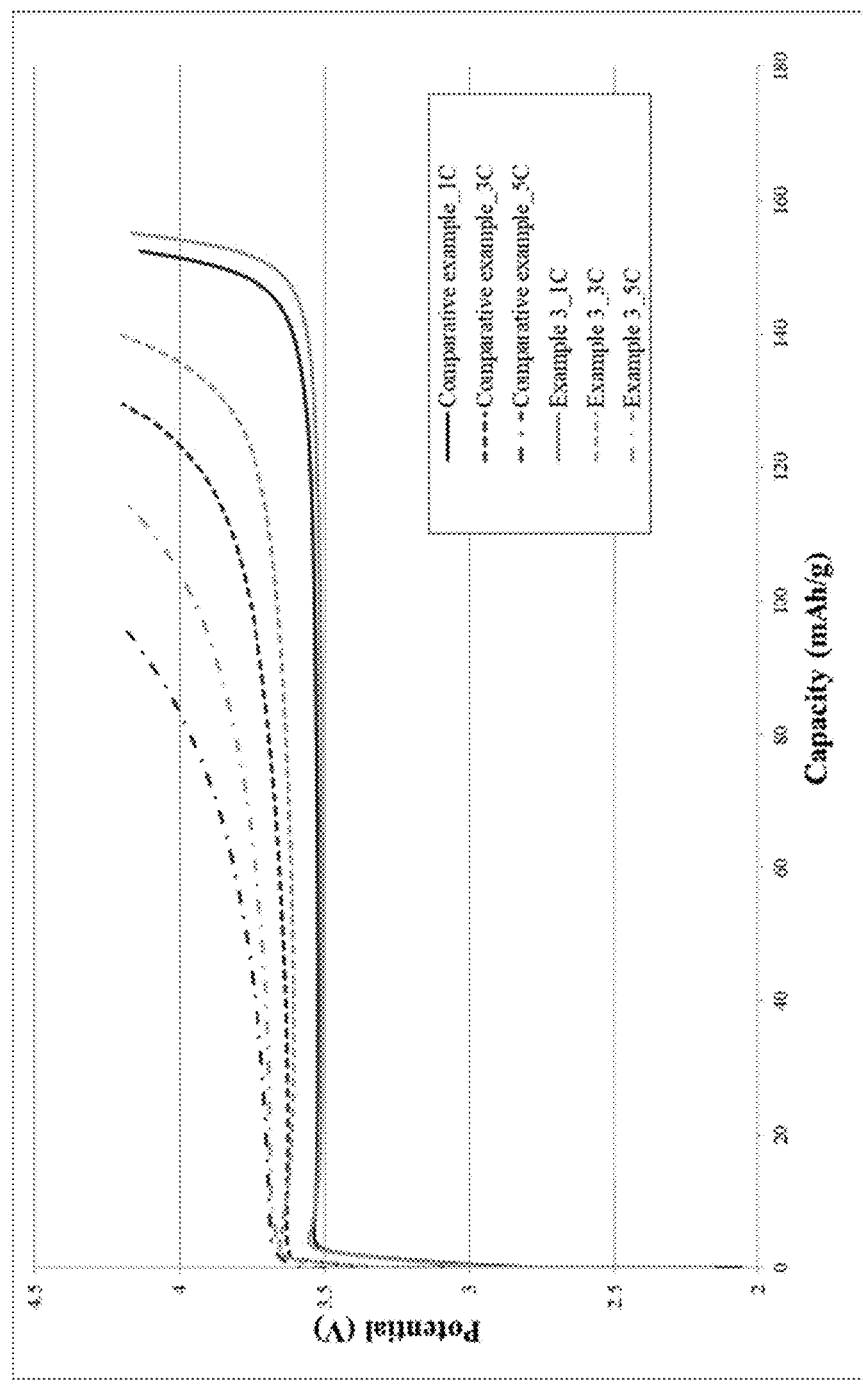
FIG. 7A is a charging characteristic diagram (potential vs. capacity) of the comparative example and an example 3 at different C-rates.
Figure 7B:
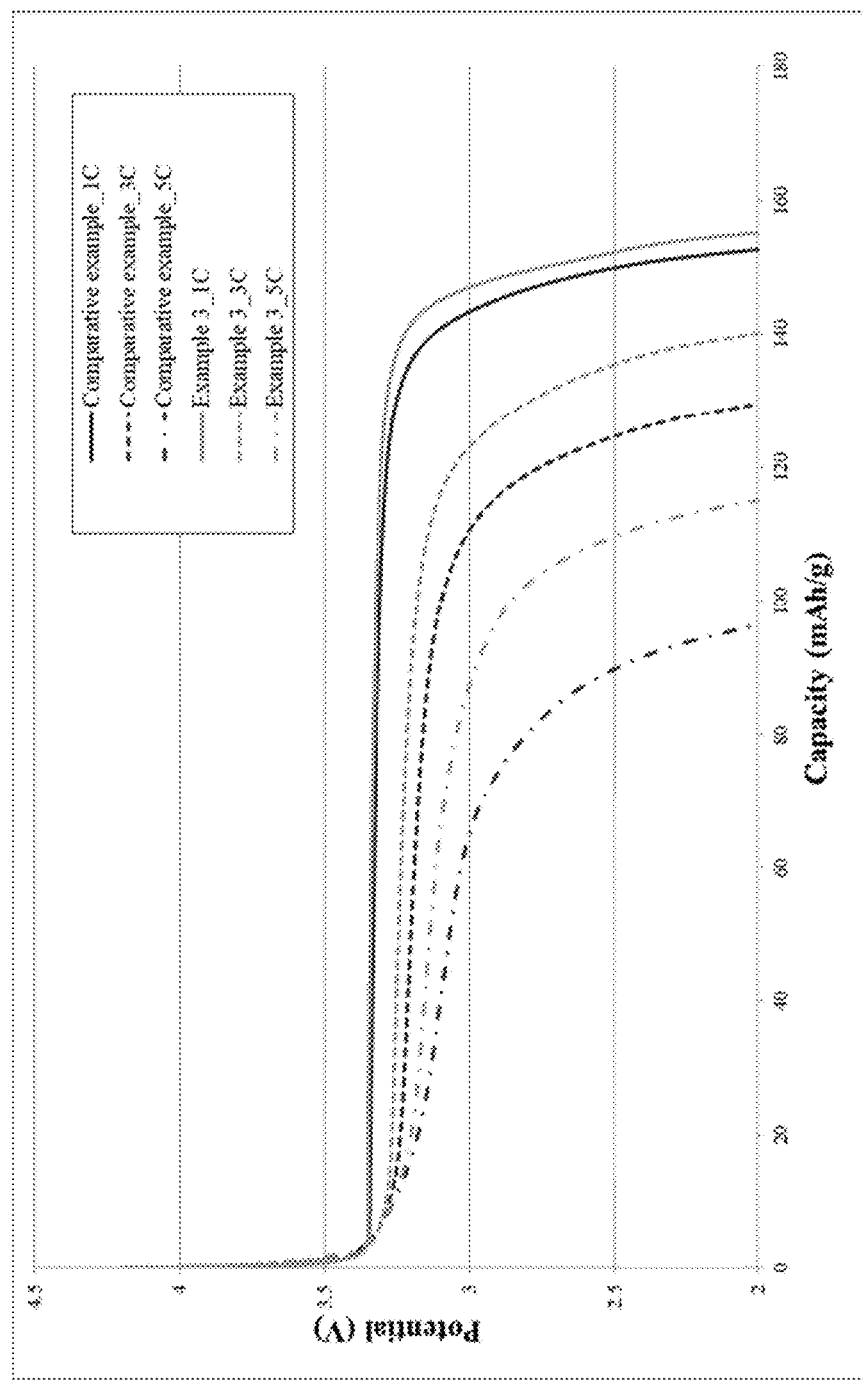
FIG. 7B is a discharging characteristic diagram (potential vs. capacity) of the comparative example and the example 3 at different C-rates.
Figure 8A:
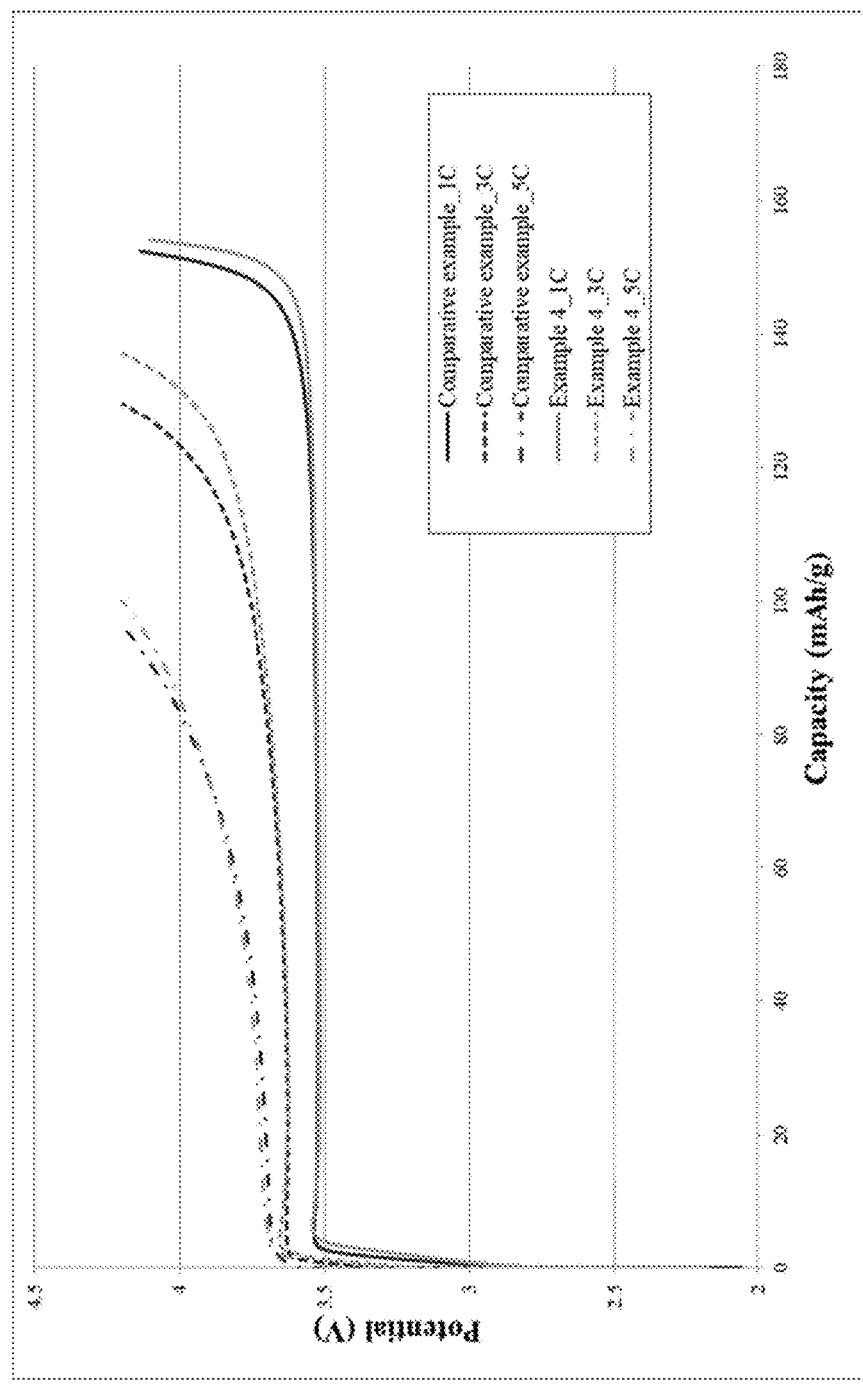
FIG. 8A is a charging characteristic diagram (potential vs. capacity) of the comparative example and an example 4 at different C-rates.
Figure 8B:
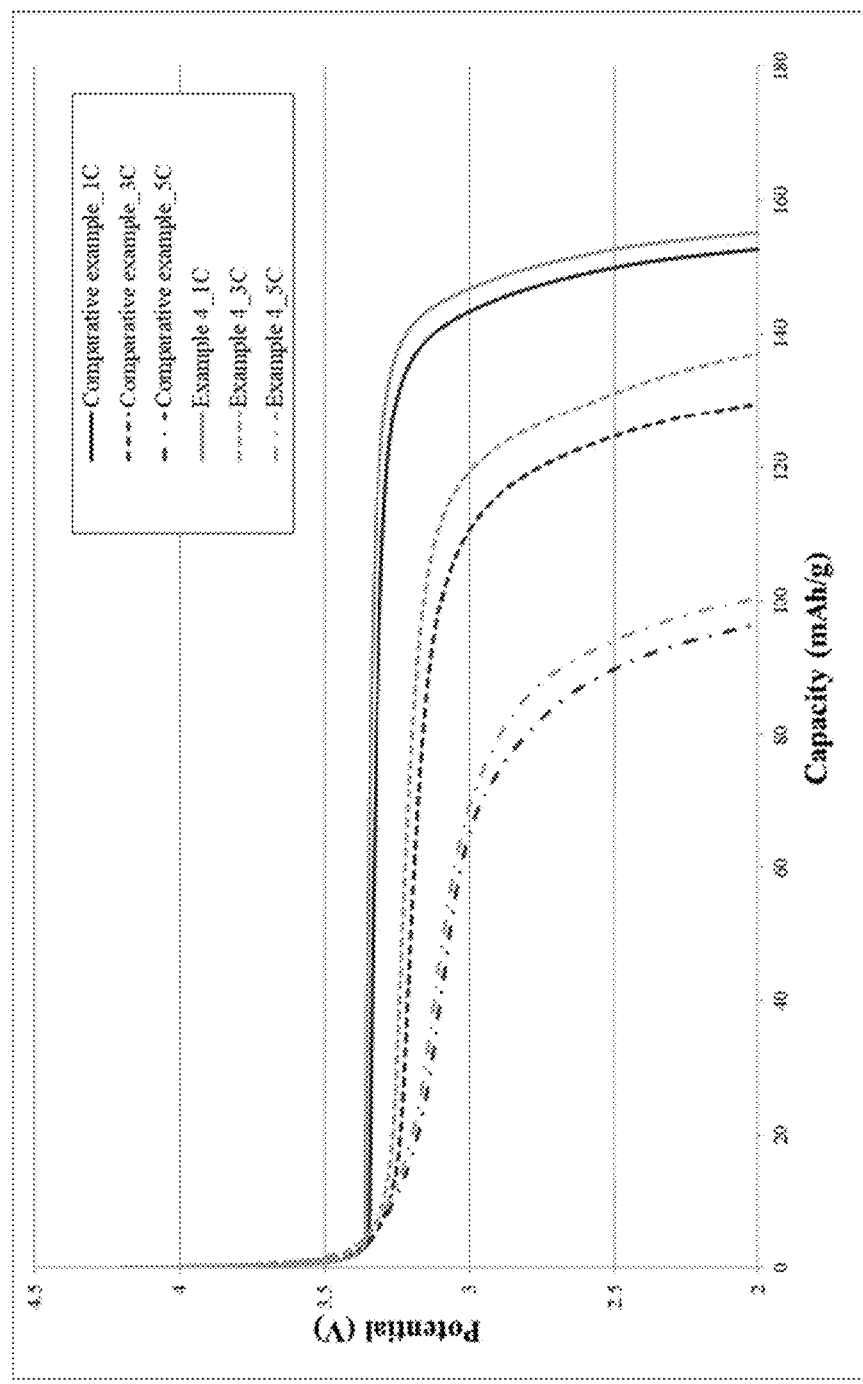
FIG. 8B is a discharging characteristic diagram (potential vs. capacity) of the comparative example and the example 4 at different C-rates.

Refer to FIGS. 5A to 8B. FIGS. 5A to 5B are charging and discharging characteristic diagrams (potential vs. capacity) of a comparative example and an example 1 at C-rates of 1 C, 3 C and 5 C. FIGS. 6A to 6B are charging and discharging characteristic diagrams (potential vs. capacity) of the comparative example and an example 2 at C-rates of 1 C, 3 C and 5 C. FIGS. 7A to 7B are charging and discharging characteristic diagrams (potential vs. capacity) of the comparative example and an example 3 at C-rates of 1 C, 3 C and 5 C. FIGS. 8A to 8B are charging and discharging characteristic diagrams (potential vs. capacity) of the comparative example and an example 4 at C-rates of 1 C, 3 C and 5 C. FIGS. 5A to 8B show the results of half-cell tests on the positive plates of the examples 1 to 4 and the comparative example of the present disclosure under the same condition. As shown in the figures, when charging and discharging at C-rates of 1 C, 3 C, and 5 C, the capacities of the examples 1 to 4 of the present disclosure are all greater than the comparative example. It is noted that the capacities of the examples 1 to 4 are significantly improved compared to the comparative example at higher charging and discharging rate, and have excellent fast charging performance.

The following table 1 shows the comparison of the capacity test results of the comparative example, the example 1, the example 2, the example 3 and the example 4 at C-rate of 1 C when the charge reaches 4.2 V. As shown in table 1, the capacities of the examples 1 to 4 at potential of 4.2 V are increased slightly by about 1% to 4% compared to the comparative example. The example 2 in which the weight percentage of the first conductive carbon in the composite material is 1.21% has the highest increase. By mixing the lithium metal phosphate material and the conductive carbon of the present disclosure by a mechanical method previously, the conductive carbon is arranged uniformly, and the proportion of subsequently added conductive carbon is decreased. The loading density of the cathode material and the bonding strength between the cathode material and the substrate are both increased. Accordingly, the capacity of the cathode material of the present disclosure increased, and the excellent charging and discharging performance is achieved.

TABLE 1

| | Highest capacity at C-rate of 1 C (mAh/g) | Percentage increase in highest capacity compared to the comparative example |
|---|---|---|
| Comparative example | 152.63 | — |

TABLE 1-continued

|  | Highest capacity at C-rate of 1 C (mAh/g) | Percentage increase in highest capacity compared to the comparative example |
|---|---|---|
| Example 1 | 155.01 | 1.56% |
| Example 2 | 158.42 | 3.79% |
| Example 3 | 155.07 | 1.60% |
| Example 4 | 154.41 | 1.16% |

The following table 2 shows the comparison of the capacity test results of the comparative example, the example 1, the example 2, the example 3 and the example 4 at C-rate of 3 C when the charge reaches 4.2 V. As shown in table 1, the capacities of the examples 1 to 4 at potential of 4.2 V are increased significantly by about 5% to 12% compared to the comparative example. The example 2 in which the weight percentage of the first conductive carbon in the composite material is 1.21% has the highest increase. By mixing the lithium metal phosphate material and the conductive carbon of the present disclosure by the mechanical method previously, the conductive carbon is arranged uniformly, and the proportion of subsequently added conductive carbon is decreased. The loading density of the cathode material and the bonding strength between the cathode material and the substrate are both increased. Accordingly, the capacity of the cathode material of the present disclosure increased, and the excellent charging and discharging performance is achieved.

TABLE 2

|  | Highest capacity at C-rate of 3 C (mAh/g) | Percentage increase in highest capacity compared to the comparative example |
|---|---|---|
| Comparative example | 129.64 | — |
| Example 1 | 140.69 | 8.52% |
| Example 2 | 144.67 | 11.59% |
| Example 3 | 139.76 | 7.81% |
| Example 4 | 137.09 | 5.75% |

The following table 3 shows the comparison of the capacity test results of the comparative example, the example 1, the example 2, the example 3 and the example 4 at C-rate of 5 C when the charge reaches 4.2 V. As shown in table 3, the capacities of the examples 1 to 4 at potential of 4.2 V are increased significantly by about 20% to 30% compared to the comparative example. The example 2 in which the weight percentage of the first conductive carbon in the composite material is 1.21% has the highest increase. By mixing the lithium metal phosphate material and the conductive carbon of the present disclosure by a mechanical method previously, the conductive carbon is arranged uniformly, and the proportion of subsequently added conductive carbon is decreased. The loading density of the cathode material and the bonding strength between the cathode material and the substrate are both increased. Accordingly, the cathode material of the present disclosure maintains high capacity at high charging and discharging rate, and the excellent charging and discharging performance is achieved.

TABLE 3

|  | Highest capacity at C-rate of 5 C (mAh/g) | Percentage increase in highest capacity compared to the comparative example |
|---|---|---|
| Comparative example | 96.12 | — |
| Example 1 | 120.55 | 25.42% |
| Example 2 | 125.26 | 30.32% |
| Example 3 | 115.02 | 19.66% |
| Example 4 | 100.11 | 4.15% |

Figure 9A:
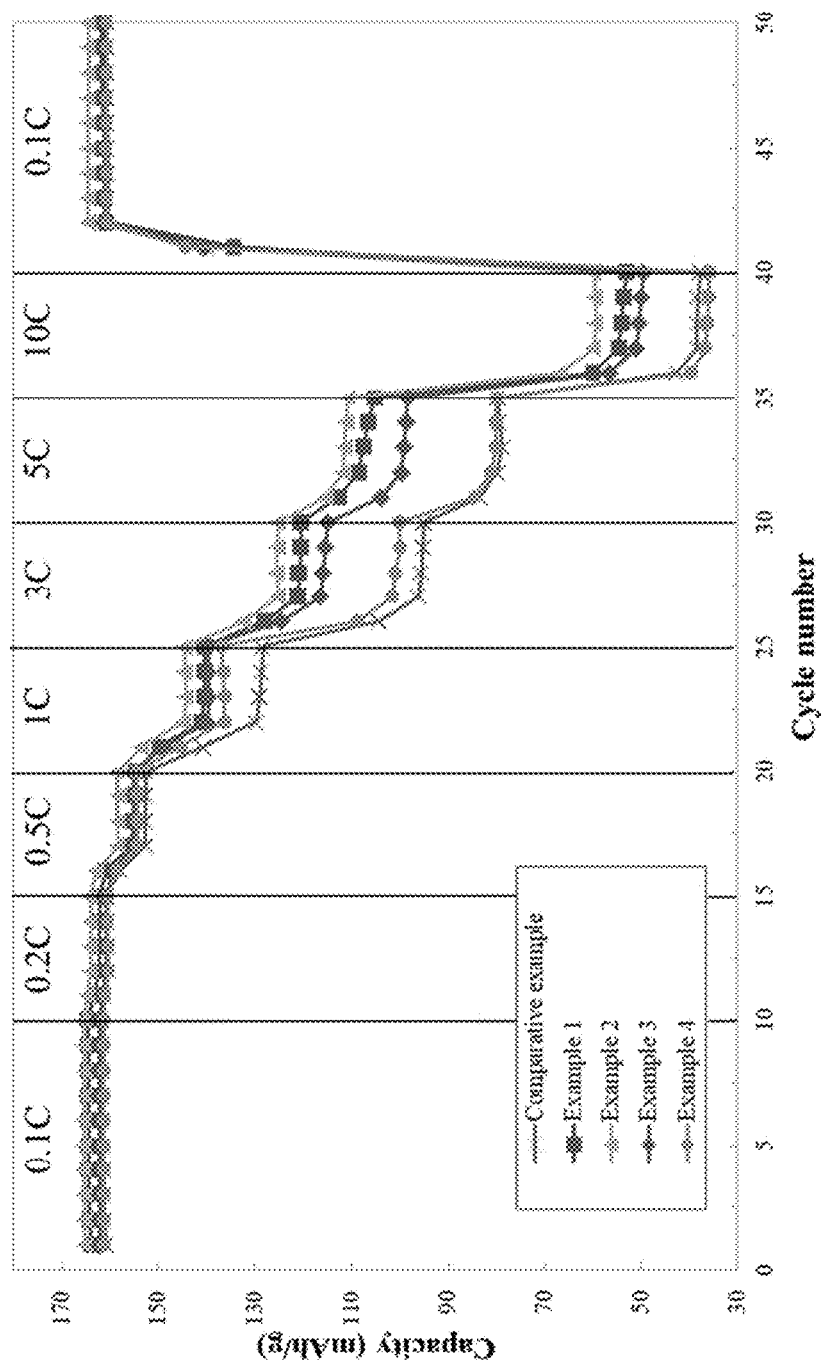
FIG. 9A is a charging characteristic diagram (capacity vs. cycle number) of the comparative example, the example 1, the example 2, the example 3 and the example 4 at different C-rates.
Figure 9B:
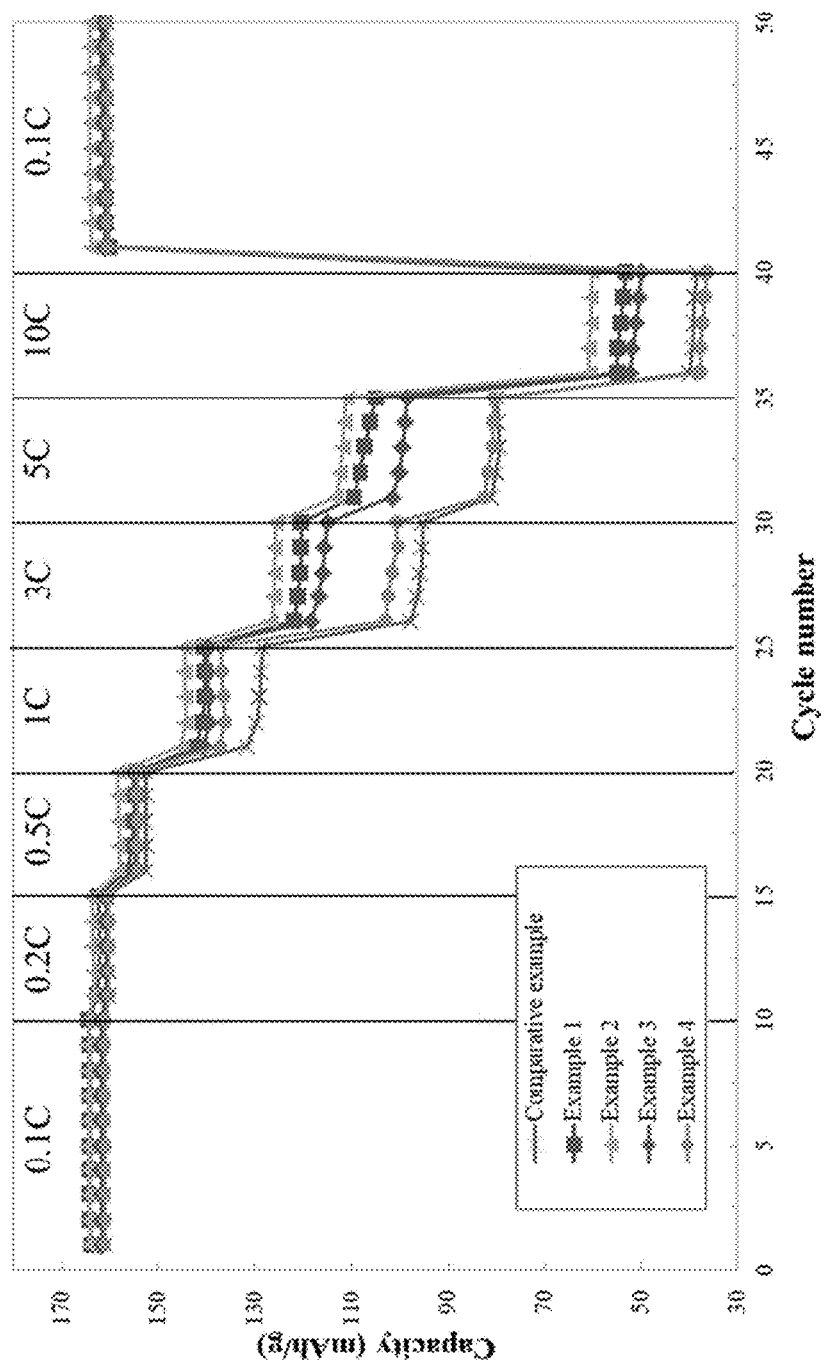
FIG. 9B is a discharging characteristic diagram (capacity vs. cycle number) of the comparative example, the example 1, the example 2, the example 3 and the example 4 at different C-rates.

Refer to FIGS. 9A to 9B. FIG. 9A is a charging characteristic diagram (capacity vs. cycle number) of the comparative example, the example 1, the example 2, the example 3 and the example 4 at different C-rates. FIG. 9B is a discharging characteristic diagram (capacity vs. cycle number) of the comparative example, the example 1, the example 2, the example 3 and the example 4 at different C-rates. FIGS. 9A to 9B show the results of half-cell tests on the positive plates of the examples 1 to 4 and the comparative example of the present disclosure under the same condition. The comparative example, the example 1, the example 2, the example 3 and the example 4 are tested in sequence at C-rates of 0.2 C, 0.5 C, 1 C, 3 C, 5 C for 5 to 10 cycle numbers, respectively. As shown in the figures, the capacities of the examples 1 to 3 are significantly greater than the comparative example at C-rates of 1 C, 3 C and 5 C. By mixing the lithium metal phosphate material and the conductive carbon of the present disclosure by the mechanical method previously, the conductive carbon is arranged uniformly, and the proportion of subsequently added conductive carbon is decreased. The loading density of the cathode material and the bonding strength between the cathode material and the substrate are both increased. Accordingly, the cathode material of the present disclosure maintains high capacity at high charging and discharging rate, and the excellent charging and discharging performance is achieved.

As stated above, a preparation method of a cathode material for a secondary battery that stably improves charging and discharging performance thereof is provided in the present disclosure. A lithium metal phosphate material is made of a plurality of secondary particles. Each of the secondary particles is formed by the aggregation of a plurality of primary particles. First, the lithium metal phosphate material and a first conductive carbon are mixed by a mechanical method, such as a mechanofusion method, and a composite material is prepared. The first conductive carbon is uniformly arranged in an interparticle space formed between the plurality of primary particles. Next, the composite material, a second conductive carbon, a binder and a solvent are mixed by, for example, a vacuum mixer, and the cathode material is prepared. Finally, the cathode material is coated on a substrate, such as an aluminum coil, and a positive plate is prepared. By mixing the lithium metal phosphate material and a part of the conductive carbon by the mechanical method previously, the conductive carbon is uniformly arranged between the primary particles of the lithium metal phosphate material. The interface impedance caused by the interparticle space is reduced, and the uniformity of the ingredients is improved. Since part of the conductive carbon already exists in the composite material, when the composite material, the binder, and the solvent are mixed, only a small amount of conductive carbon needs to be added to prepare the cathode material. By adding less conductive carbon when mixing, the viscosity of the slurry is reduced and the solid content is increased. The loading density of the cathode material coated on the substrate and the adhesion strength between them are both increased. The preparation method of the cathode material is simple and easy to control. The positive plate made of the cathode material maintains high capacity at high charging and discharging rate (C-rate), and the excellent fast charging performance is achieved.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A preparation method of a cathode material for a secondary battery, comprising steps of:
    (a) providing a lithium metal phosphate material and a first conductive carbon, wherein the lithium metal phosphate material is made of a plurality of secondary particles, each of the secondary particles is formed by the aggregation of a plurality of primary particles, and an interparticle space is formed between the plurality of primary particles;
    (b) dry mixing the lithium metal phosphate material and the first conductive carbon by a mechanical method to prepare a composite material, wherein the first conductive carbon is uniformly arranged in the interparticle space, wherein the first conductive carbon consists of particles, and the lithium metal phosphate material and the first conductive carbon have a weight ratio of 9:1 to 17:1;
    (c) after step (b), providing a second conductive carbon, a binder and a solvent, wherein the composite material and the second conductive carbon have a weight ratio of 8.04:0.96 to 8.17:0.3; and
    (d) after step (c), mixing the composite material, the second conductive carbon, the binder and the solvent to prepare the cathode material for preparing a positive plate.

2. The preparation method according to claim 1, wherein a composition of the lithium metal phosphate material comprises $LiMPO_4$, wherein M is one selected from the group consisting of iron, nickel, cobalt, manganese, magnesium, titanium, aluminum, tin, chromium, vanadium, molybdenum and a combination thereof.

3. The preparation method according to claim 1, wherein the plurality of primary particles has an average particle size ranged from 50 nm to 500 nm.

4. The preparation method according to claim 1, wherein the plurality of secondary particles has an average particle size ranged from 2 μm to 100 μm.

5. The preparation method according to claim 1, wherein the first conductive carbon has an average particle size ranged from 10 nm to 200 nm.

6. The preparation method according to claim 1, wherein the mechanical method is a mechanofusion method which causes the lithium metal phosphate material and the first conductive carbon to react and form the composite material.

7. The preparation method according to claim 6, wherein the mechanical method has a working temperature ranged from 25° C. to 35° C.

8. The preparation method according to claim 6, wherein the mechanical method has a rotational speed ranged from 100 rpm to 2000 rpm.

9. The preparation method according to claim 1, wherein the first conductive carbon in the composite material has a weight percentage ranged from 0.5% to 10%.

10. The preparation method according to claim 1, wherein the step (d) further comprises a step of:
    (d1) coating the cathode material on a substrate and drying to prepare the positive plate.

* * * * *